US011782894B2

(12) United States Patent
Chen

(10) Patent No.: US 11,782,894 B2
(45) Date of Patent: Oct. 10, 2023

(54) USER CONNECTION DEGREE MEASUREMENT

(71) Applicant: SAP SE, Walldorf (DE)

(72) Inventor: Wei Chen, Shanghai (CN)

(73) Assignee: SAP SE, Walldorf (DE)

(*) Notice: Subject to any disclaimer, the term of this patent is extended or adjusted under 35 U.S.C. 154(b) by 69 days.

(21) Appl. No.: 17/524,096

(22) Filed: Nov. 11, 2021

(65) Prior Publication Data

US 2023/0145179 A1    May 11, 2023

(51) Int. Cl.
*G06F 16/00* (2019.01)
*G06F 16/22* (2019.01)
(Continued)

(52) U.S. Cl.
CPC ...... *G06F 16/2246* (2019.01); *G06F 16/2425* (2019.01); *G06F 16/2455* (2019.01);
(Continued)

(58) Field of Classification Search
CPC ............... G06F 16/2246; G06F 16/282; G06F 16/24578; G06F 16/10–11; G06F 16/13–14; G06F 16/148; G06F 16/185; G06F 16/182; G06F 16/235; G06F 16/288; G06F 16/2425; G06F 16/2455; G06F 16/3331; G06F 16/24568; G06F 16/9038;
(Continued)

(56) References Cited

U.S. PATENT DOCUMENTS

| 9,148,701 B2* | 9/2015 | Craner ............. H04N 21/44213 |
| 2002/0111887 A1* | 8/2002 | McFarlane ............. G06Q 10/10 |
| | | 709/224 |

(Continued)

FOREIGN PATENT DOCUMENTS

| CA | 2744473 A1 * | 12/2011 |
| WO | WO 2007135690 A2 * | 11/2007 |
| WO | WO2009157997 A2 * | 11/2009 |

OTHER PUBLICATIONS

Ning Man et al., "Hierarchical user interest model based on large log data of mobile internet", 13th International Conference on Service Systems and Service Management (ICSSSM) (pp. 1-5), Aug. 2016.*

*Primary Examiner* — Srirama Channavajjala
(74) *Attorney, Agent, or Firm* — SCHWEGMAN LUNDBERG & WOESSNER, P.A.

(57) ABSTRACT

Systems, methods, and computer-readable media are provided for determining a connection degree between users. Upon receiving user data, a report line hierarchy tree is updated, the hierarchy tree including user reporting information and relationships within an organization received from user profile data. A report line feature code is determined for each user by a feature code generator based on the report line hierarchy tree and stored in a data store. A location hierarchy tree is generated based on physical location information from the user profile data. A location feature code is determined for each user based on the location hierarchy tree and is also stored in the data store. To determine a connection degree between one or more users the feature codes including either or both of the report line feature codes and the location feature codes of the users are retrieved from the data store and compared.

16 Claims, 9 Drawing Sheets

(51) Int. Cl.
*G06F 16/28* (2019.01)
*G06F 16/2457* (2019.01)
*G06F 16/242* (2019.01)
*G06F 16/2455* (2019.01)
*G06F 16/33* (2019.01)
*G06F 16/9038* (2019.01)

(52) U.S. Cl.
CPC .. *G06F 16/24568* (2019.01); *G06F 16/24578* (2019.01); *G06F 16/282* (2019.01); *G06F 16/3331* (2019.01); *G06F 16/9038* (2019.01)

(58) Field of Classification Search
CPC .. G06Q 10/10; G06Q 10/0637; G06Q 10/067; G06Q 10/1053; G06Q 10/0639; G06Q 10/06393; G06Q 10/105
See application file for complete search history.

(56) References Cited

U.S. PATENT DOCUMENTS

| | | | |
|---|---|---|---|
| 2004/0111431 A1* | 6/2004 | Zeller | G06Q 10/067 |
| 2010/0005088 A1* | 1/2010 | Zhang | G06F 16/9535 |
| | | | 707/E17.108 |
| 2010/0100561 A1* | 4/2010 | Cooper | G06Q 10/10 |
| | | | 707/769 |
| 2014/0006393 A1* | 1/2014 | Soshin | G06F 16/9535 |
| | | | 707/E17.014 |
| 2014/0282098 A1* | 9/2014 | McConnell | G06Q 10/0639 |
| | | | 715/753 |
| 2016/0306965 A1* | 10/2016 | Iyer | G06Q 10/0635 |
| 2017/0017383 A1* | 1/2017 | Upadhyaya | G06Q 10/105 |
| 2017/0236081 A1* | 8/2017 | Grady Smith | G06Q 10/0637 |
| | | | 705/7.36 |
| 2019/0066056 A1* | 2/2019 | Gomez | G06Q 10/06393 |
| 2021/0201267 A1* | 7/2021 | Peer | G06Q 10/10 |
| 2022/0092514 A1* | 3/2022 | Guru | G06Q 10/1053 |

* cited by examiner

USER CONNECTION DEGREE MEASUREMENT

BACKGROUND

User search functions are often provided in which a searching user searches amongst a plurality of other users. However, said search functions are not able to provide search results based on the relationship between the searching user and the plurality of other users. Accordingly, it is difficult to organize the search results in a meaningful way.

Some search systems merely organize search results in alphabetical order which provides no additional information to the searching user and does not consider the context of the search function such as the identity and relationships of the searching user. Additionally, search systems have been developed which merely place users in a similar department at the beginning of the search results. However, said systems struggle to differentiate between users in varying operational levels such as would exist in a complex hierarchical structure, for example, within a large corporation or organization.

SUMMARY

Embodiments solve the above-mentioned problems by providing systems, methods, and computer-readable media for determining a connection degree between a first user and one or more other users. Responsive to receiving newly created or updated user data, a report line hierarchy tree is updated by a hierarchy updater, the hierarchy tree including user reporting information based on user roles, connections, and relationships within an organization received from user profile data. A report line feature code is determined for each user by a feature code generator based on the report line hierarchy tree and stored in a data store. A location hierarchy tree is generated based on physical location information from the user profile data. A location feature code is determined for each user based on the location hierarchy tree and is also stored in the data store. To determine a connection degree between one or more users the feature codes including either or both of the report line feature codes and the location feature codes of the users are retrieved from the data store and compared. A list of users can be generated by an employee search controller based on the comparisons of feature codes where the users may be listed in order of relevancy.

A first embodiment is directed to one or more non-transitory computer-readable media storing computer-executable instructions that, when executed by a processor, perform a method for determining a connection degree, the method comprising importing a set of user profile data, storing the set of user profile data in a user profile data store, notifying a hierarchy updater in response to importing the set of user profile data, reading the set of user profile data and updating a hierarchy tree based on the set of user profile data, storing the updated hierarchy tree in a hierarchy data store, notifying a feature code generator in response to storing the hierarchy tree, reading the updated hierarchy tree and generating a feature code based on the updated hierarchy tree, the feature code configured to determine a connection degree between a first user and a plurality of other users associated with the hierarchy tree, and storing the feature code in a feature code data store.

A second embodiment is directed to a method for determining a connection degree, the method comprising importing a set of user profile data, storing the set of user profile data in a user profile data store, notifying a hierarchy updater in response to importing the set of user profile data, reading the set of user profile data and updating a hierarchy tree based on the set of user profile data, storing the updated hierarchy tree in a hierarchy data store, notifying a feature code generator in response to storing the hierarchy tree, reading the updated hierarchy tree and generating a feature code based on the updated hierarchy tree, the feature code configured to determine a connection degree between a first user and a plurality other users associated with the hierarchy tree, and storing the feature code in a feature code data store.

A third embodiment is directed to a system for determining a connection degree, the system comprising a user profile data store, a hierarchy data store, a feature code data store, and a processor for executing a method of determining a connection degree, the method comprising importing a set of user profile data, storing the set of user profile data in the user profile data store, notifying a hierarchy updater in response to importing the set of user profile data, reading the set of user profile data and updating a hierarchy tree based on the set of user profile data, storing the updated hierarchy tree in the hierarchy data store, notifying a feature code generator in response to storing the hierarchy tree, reading the updated hierarchy tree and generating a feature code based on the updated hierarchy tree, the feature code configured to determine a connection degree between a first user and a plurality other users associated with the hierarchy tree, and storing the feature code in the feature code data store.

Additional embodiments are directed to generating and organizing a list of search results based on a comparison of feature codes which are based on a hierarchical structure. The comparison of feature codes may comprise calculating one or more feature code differences which relate to the connection degree between two users.

Further, some embodiments are directed to generating a list of search results for display within a graphical user interface, wherein the list of search results is organized based on a comparison of feature codes. The feature codes are generated based on a hierarchy tree comprising one or more of report line data or location data from a user profile data store.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
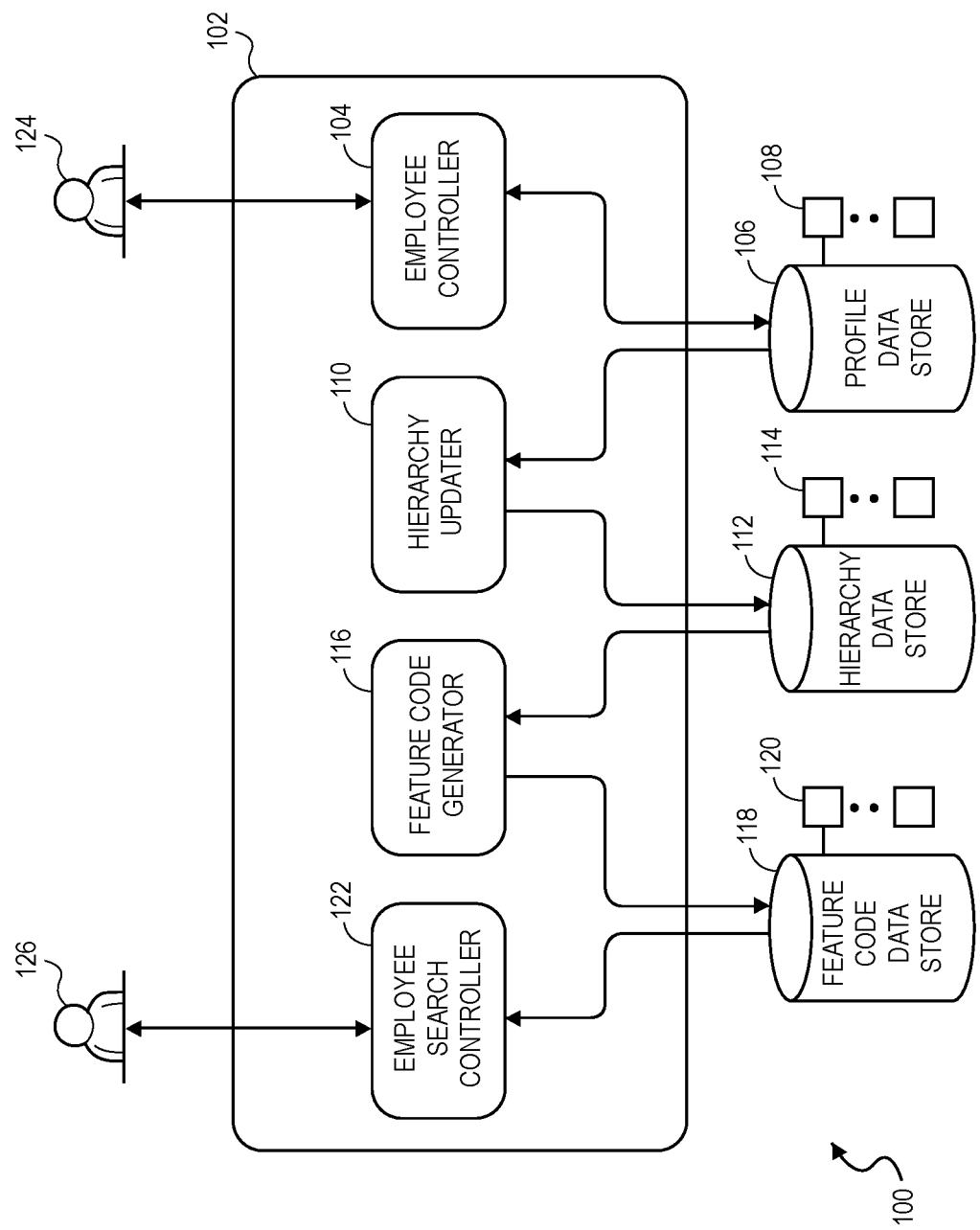
FIG. 1 depicts an exemplary system diagram relating to some embodiments.

The drawing figures do not limit the disclosure to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the disclosure in sufficient detail to enable those skilled in the art to practice the present teachings. Other embodiments can be utilized and changes can be made without departing from the scope of the disclosure. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary diagram of system 100 is depicted relating to some embodiments. In some embodiments, the system may comprise a processing component 102 which may be a server or another device comprising one or more processors for executing various operations relating to certain embodiments. Alternatively, in some embodiments, the processing component 102 may comprise a plurality of portions distributed across various different physical locations. Further, in some embodiments, cloud-based processing may be used such that execution of processing operations may be performed remotely.

In some embodiments, an employee controller 104 may be included for managing employee data. Accordingly, the employee controller 104 may be communicatively coupled to a user profile data store 106, as shown, such that data stored in the user profile data store 106 is accessible to the employee controller 104. In some embodiments, a bidirectional communication connection may be included between the employee controller 104 and the user profile data store 106 such that the employee controller 104 has the ability to both read and write employee data stored in the user profile data store 106. In some embodiments, the user profile data store 106 stores user data, such as employee profile data associated with a respective plurality of users. For example, one or more sets of profile data 108 such as user profiles may be stored in the user profile data store 106, as shown. In some embodiments, data for each of the user profiles may be stored within a user profile data table within the user profile data store 106.

In some embodiments, a hierarchy updater 110 is included for managing and updating hierarchy information. Accordingly, the hierarchy updater 110 may be communicatively coupled to a hierarchy data store 112, as shown, to manage a set of hierarchy data stored thereon. For example, one or more hierarchy trees 114 may be stored on the hierarchy data store 112. In some embodiments, each of the hierarchy trees 114 includes relationships between various entities or concepts. For example, in one embodiment, a report line hierarchy tree may be included comprising information indicative of a plurality of report line employee relationships. For example, the report line hierarchy tree may include information such as a manager-employee relationship between a manager user and an employee user within a certain organization. Further, hierarchy trees may be location hierarchy trees including information indicative of a plurality of location-based relationships, as will be discussed in further detail below.

A feature code generator 116 may be included for generating a feature code based on one or more hierarchy trees from the hierarchy data store 112. In some embodiments, a feature code generation function may be used to read the hierarchy tree and generate a corresponding feature code. The feature code generator 116 may be communicatively coupled to a feature code data store 118, as shown, such that the generated feature code can be stored on the feature code data store 118. Accordingly, the feature code data store 118 may store one or more sets of feature code data 120. In some embodiments, the set of feature code data 120 may include either of report line feature codes or location feature codes. Further, embodiments are contemplated in which the feature code data store 118 stores multiple types of feature codes. For example, report line feature codes and location feature codes may be both stored on the feature code data store 118.

An employee search controller 122 may be included for generating a search query based at least in part on the feature code data 120. For example, in some embodiments, the employee search controller 122 may compare one or more feature codes to determine a set of feature code distances and generate a search query results list based on the feature code distances. In some embodiments, one or more users may interact with various components of the system 100. For example, in some embodiments, a data import user 124 may interact with the employee controller 104, as shown, to import employee data into the system 100. Further, in some embodiments, a searcher user 126 may interact with the search controller to transmit a search request to the employee search controller 122. For example, in response to the search request the employee search controller 122 may calculate a plurality of distance values associated with the comparisons of a feature code associated with the searcher user 126 and feature codes of a plurality of other users.

Figure 2A:
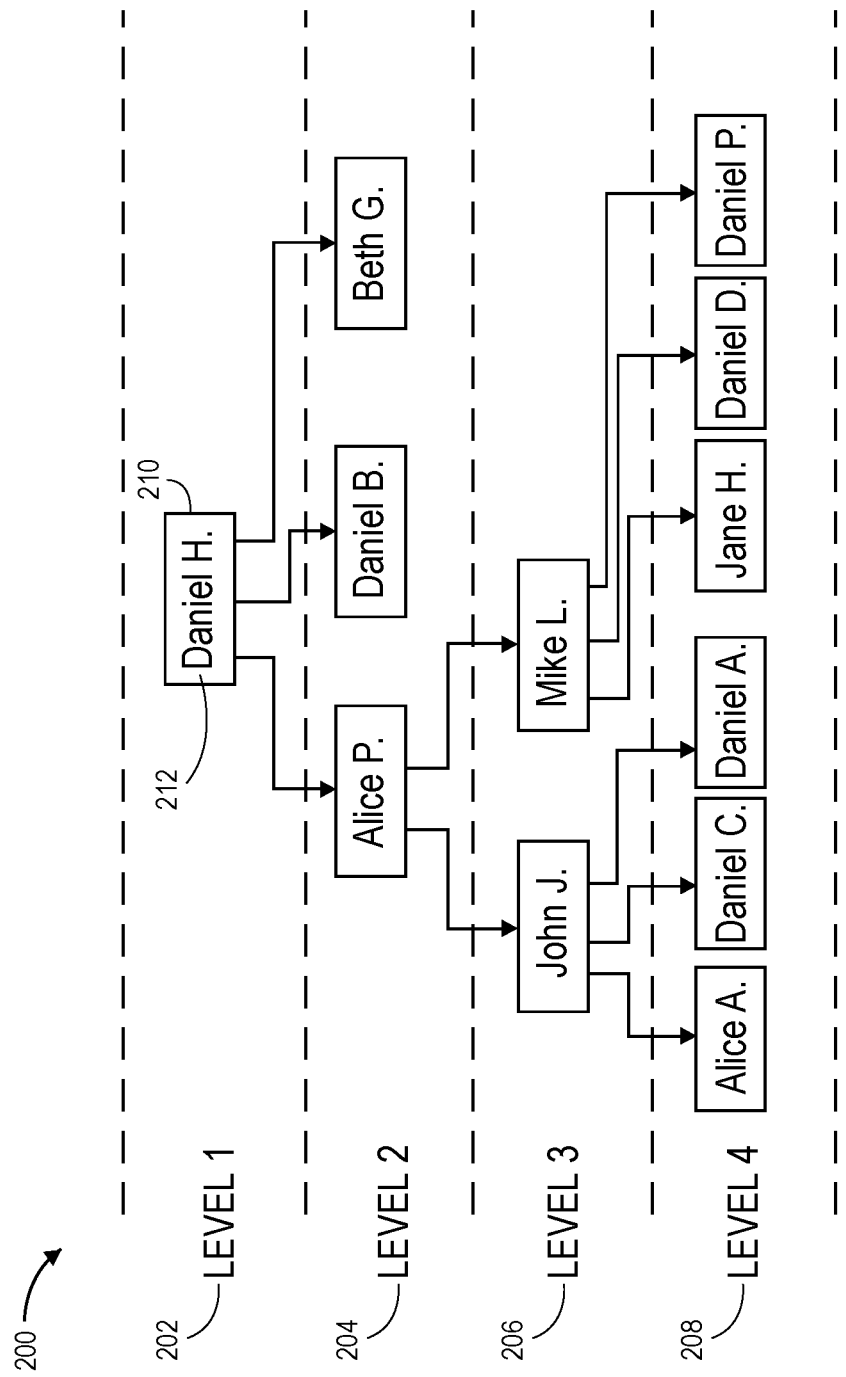
FIG. 2A depicts an exemplary report line hierarchy tree relating to some embodiments.

Turning now to FIG. 2A, an exemplary report line hierarchy tree 200 is depicted relating to some embodiments. In some embodiments, the report line hierarchy tree 200 may include information relating to an employee report line. For example, the report line hierarchy tree 200 may indicate which employees report to a certain supervisor and may provide information regarding each of a plurality of employees or other user's roles within an organization. In some embodiments, the report line hierarchy tree 200 includes a plurality of levels. For example, the plurality of levels of the report line hierarchy tree 200 may include a first level 202, a second level 204, a third level 206, and a fourth level 208, as shown. However, in some embodiments, more or fewer levels may be included.

In some embodiments, the report line hierarchy tree 200 comprises a plurality of entries 210. Here, each of the entries 210 may correspond to a specific employee or user in the report line. Accordingly, each entry 210 may comprise an employee indicator 212, as shown, which may be any of an employee identifier or an employee name. In some embodiments, the levels 202, 204, 206, and 208 correspond to the report line hierarchy of a given organization. In one example, a user named Daniel H. may be the CEO, president, or owner of the organization and may therefore be associated with an entry in the first level 202 of the report line hierarchy tree 200, as shown. Similarly, additional users Alice P., Daniel B., and Beth G., may work directly under the owner Daniel H. and may therefore be placed in the second level 204. Further, users John J. and Mike L. may be managers reporting to Alice P. such they are in the third level 206. Each of the employees that work under John J. and Mike L. may then be placed in the fourth level 208. In some embodiments, a plurality of additional levels may be included based on the specific report line structure of a given organization.

In some embodiments, the report line hierarchy tree 200 may include or be generated based on a set of employee master data associated with a given organization. For example, report line data indicating a specific hierarchy within an organization may be stored within the set of employee master data such that the report line hierarchy tree 200 may be generated for the organization. Such a set of employee master data may be stored within the hierarchy data store 112 or may be retrieved from an external data source.

Figure 2B:
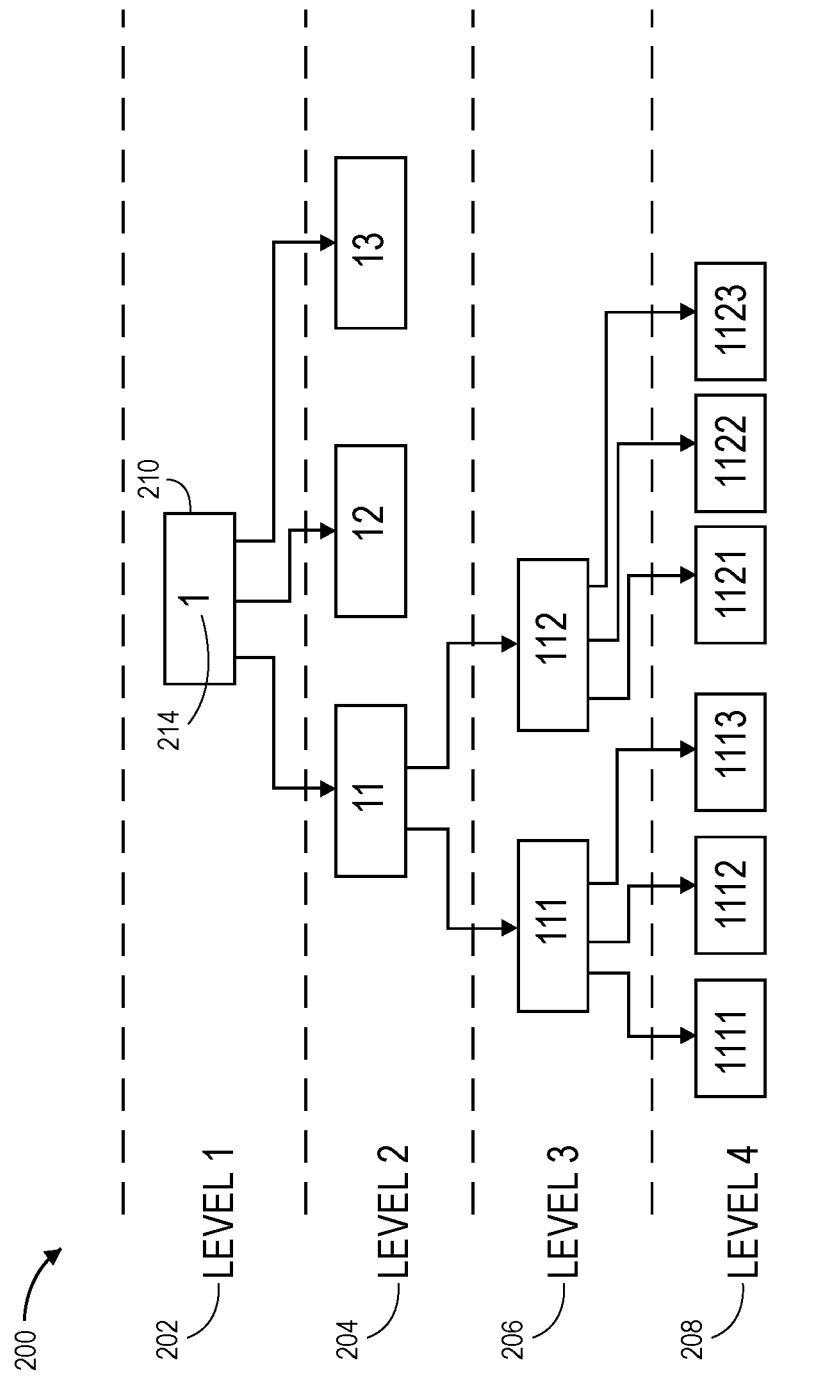
FIG. 2B depicts an exemplary feature codes for a report line hierarchy tree relating to some embodiments.

Turning now to FIG. 2B, the report line hierarchy tree 200 is depicted along with exemplary feature codes relating to some embodiments. In some such embodiments, each entry 210 of the report line hierarchy tree 200 may comprise a feature code 214, as shown. Accordingly, in such an example, a feature code "1" will correspond to Daniel H. who is the owner. In some embodiments, a plurality of feature codes 214 is generated for the respective plurality of entries 210 based on the data within the report line hierarchy tree 200 using the feature code generator 116. For example, in some embodiments, the feature codes 214 may be generated based on the layout and connections within the report line hierarchy tree 200. In some embodiments, the characters within the feature code 214 are generated based on report line data. Accordingly, the feature code of a given employee who reports to a supervisor will contain the characters of the supervisor's feature code along with one or more additional characters for the employee. As such, the feature code may indicate who the employee reports to and what other users the employee is associated with.

In some embodiment, feature codes 214 may be generated based on a variety of other information. For example, in some embodiments, feature codes 214 may be generated based on hierarchy trees which do not relate to report line data. For example, a variety of different types of hierarchy trees are contemplated, such as hierarchies related to location data, user connection data, product data, as well as any other suitable hierarchy structure for which a feature code may be generated. Further, embodiments are contemplated in which a plurality of report line hierarchy trees are included. For example, a first report line feature code may be generated based on first report line hierarchy tree including primary reporting information such as an employee reporting to a primary supervisor and a second report line feature code may be generated based on a second report line hierarchy tree including secondary reporting information such as an employee reporting to a secondary supervisor.

In some embodiments, the number of characters in the feature code 214 may correspond to the level to which the feature code relates. For example, a feature code in the first level 202 may contain a single character while a feature code in the fourth level 208 may contain four characters, as shown. Further, the characters of the feature code 214 may contain numbers, as shown, but may alternatively or additionally include letters or other suitable characters based on the number of feature codes used and the size of a given hierarchy. For example, if a hierarchy is small and only includes a handful of users feature codes consisting of only numbers may be sufficient. However, as the number of different feature codes becomes larger additional characters may be used. In some embodiments, each feature code 214 is unique such that it relates to a specific entry in the hierarchy tree. In some embodiments, each character of the feature code 214 may correspond to a particular index value, such that a variety of different types of characters may be used to provide a wide range of values for unique feature codes. Table 1 depicted below shows an exemplary relationship between characters and corresponding indexes.

TABLE 1

| Character | Index |
| --- | --- |
| 1-9 | 1-9 |
| A-Z | 10-35 |
| a-z | 36-61 |

As shown in Table 1 above, in some embodiments, numerical characters "1" through "9" may correspond to index values 1-9, capital alphabetical characters "A" through "Z" may correspond to index values 10-35, and lower-case alphabetical characters "a" through "z" may correspond to index values 36-61. Here, for example, the numerical character "1" corresponds to the index value 1, the capital alphabetical character "A" corresponds to index value 10, and so on. Accordingly, an exemplary feature code of "12B37H" would correspond to index values of 1, 2, 11, 3, 7, 17. In some embodiments, additional characters may be added such that index values exceeding 61 may be included. Further, embodiments are contemplated in which relationships between the characters and index values may be different than as shown in Table 1. For example, alphabetical characters may be used first. Further still, different types of characters may be used such as various symbols and characters of other languages. In some embodiments, a character table such as Table 1 may be used by the feature code generator 116 to determine a feature code based on the hierarchy tree. For example, the feature code generator 116 may relate particular nodes within the levels of the hierarchy tree to characters within the character table. Additionally, in some embodiments, the index values may be used to calculate a feature code distance to compare two or more feature codes, as will be described in further detail below.

Figure 3:
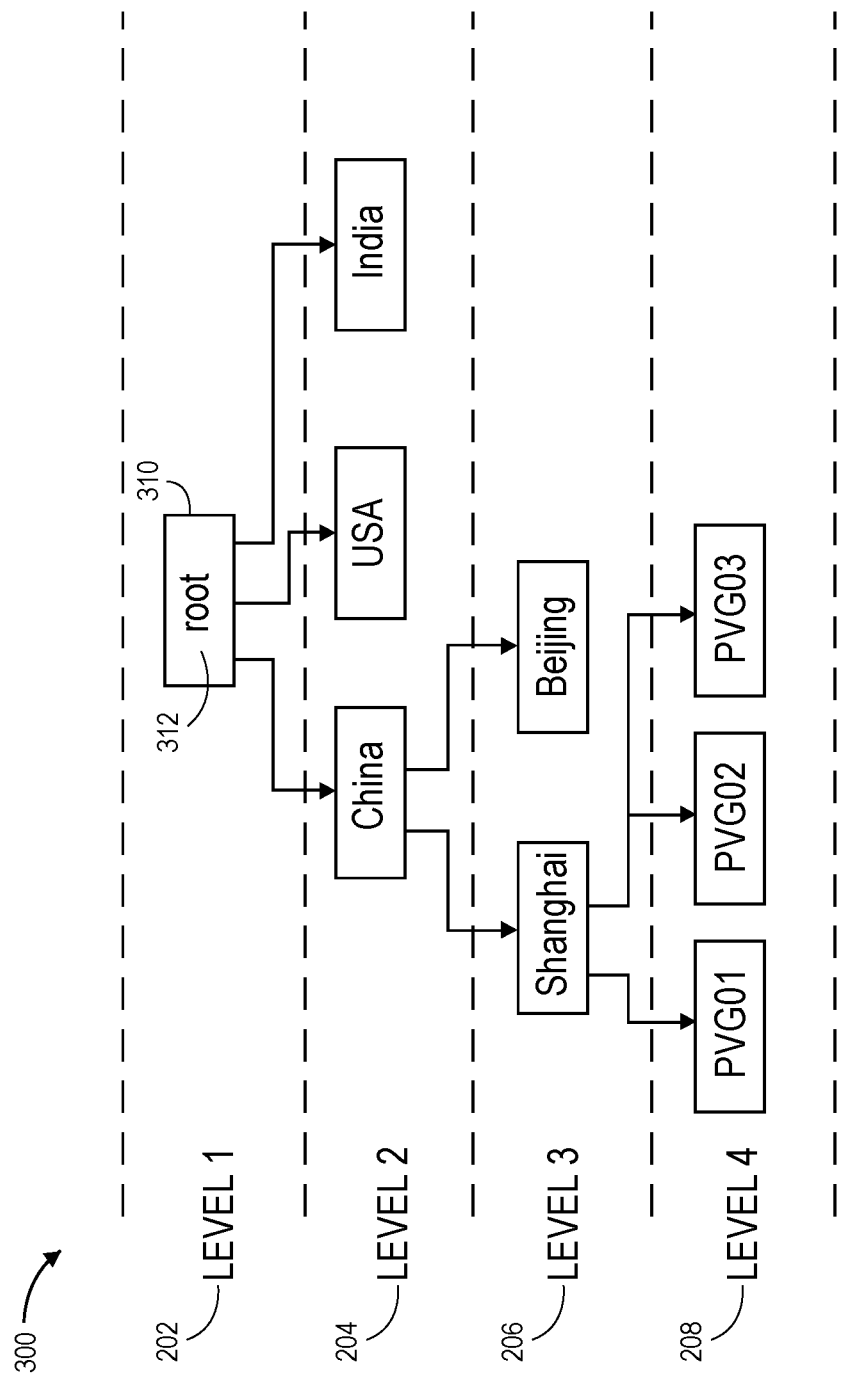
FIG. 3 depicts an exemplary location hierarchy tree relating to some embodiments.

Turning now to FIG. 3, an exemplary location hierarchy tree 300 is depicted relating to some embodiments. Similar to the report line hierarchy tree 200, the location hierarchy tree 300 may include a plurality of levels such as first level 202, second level 204, third level 206, and fourth level 208, as shown. In some embodiments, the location hierarchy tree 300 may be generated based on or may include a set of location data. For example, in some embodiments, the location hierarchy tree 300 includes information relating to a physical address or location such as a country, city, or office location. Accordingly, the location hierarchy tree 300 comprises a plurality of entries 310. Each entry may be associated with a location indication 312 corresponding to a specific physical location or region.

In some embodiments, a root location indication may be included for a root entry from which all other entries 310 descend from. Accordingly, in some embodiments, the second level 204 of the location hierarchy tree 300 may include one or more entries 310 corresponding to countries within the hierarchy. For example, the location hierarchy tree 300 may include an entry for China, U.S.A, and India, as shown. Further, entries may be included in the third level 206 relating to cities within the countries, such as, Shanghai and Beijing. Further still, entries may be included in the fourth level 208 relating to specific office locations.

Similar to as described above with respect to the report line hierarchy tree 200, feature codes 214 may be generated based on the location hierarchy tree 300. Accordingly, the feature codes 214 may be generated by the feature code generator 116 based at least in part on location data and the levels in the location hierarchy tree 300. In some embodiments, the feature codes 214 may be generated similarly to as described above, such that, for example, the root entry will have a feature code of "1" and the entries in the second level will have feature codes of "11", "12", and "13". After the feature codes 214 are generated, they may be stored in the feature code data store 118, as shown in FIG. 1.

Figure 4:
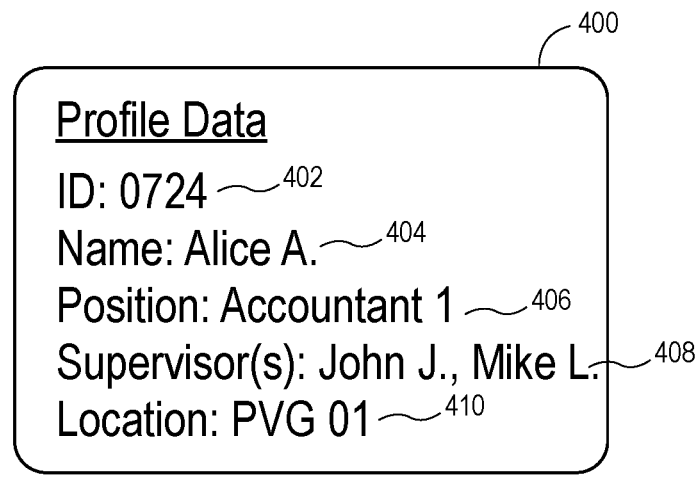
FIG. 4 depicts an exemplary profile data entry relating to some embodiments.

Turning now to FIG. 4, an exemplary profile data entry 400 is depicted relating to some embodiments. In some embodiments, the profile data entry 400 may be part of the set of profile data 108 stored in the user profile data store 106. In some such embodiments, the profile data entry 400 may include data relating to a specific user such as a user identifier 402 uniquely identifying the user, a name indicator 404 showing the user's name, a position indicator 406 indicating the job title or role of the user, a supervisor indicator 408 indicating the user's supervisor to which the user reports, and a location indicator 410 indicating a physical location associated with the user, as shown.

In some embodiments, at least a portion of the data in the profile data entry 400 may be used to generate hierarchy information. For example, the supervisor indicator 408 may be used to determine report line connections within the report line hierarchy tree 200. In some embodiments, a plurality of supervisors may be listed for a given user. For example, a user may report to both a primary supervisor and a secondary supervisor. Accordingly, embodiments are contemplated in which a hierarchy tree may be generated for each of a primary report line and a secondary report line based on the supervisor indicator 408 in the profile data entry 400. Further, the location indicator 410 may be used to relate the user to a location entry 310 within the location hierarchy tree 300.

In some embodiments, a plurality of profile data entries may be included within a profile data table which may be stored as employee master data, for example, within the profile data store 106. In some embodiments, a profile data entry 400 may be generated for each user or employee within an organization. In some embodiments, additional information may be included within the profile data entry 400 such as information further defining reporting connections between employees and additional metadata relating to the user.

Figure 5:
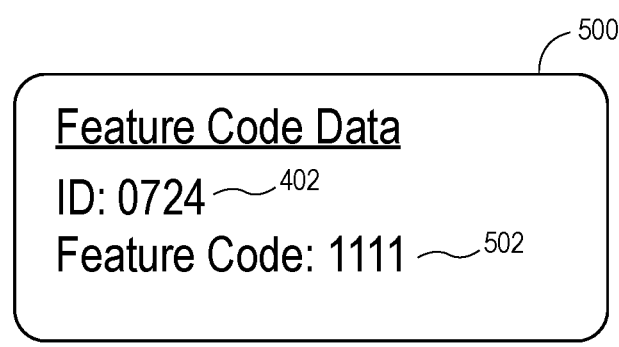
FIG. 5 depicts an exemplary feature code data entry relating to some embodiments.

Turning now to FIG. 5, an exemplary feature code data entry 500 is depicted relating to some embodiments. In some embodiments, the feature code data entry 500 may be produced in response to generating the feature code 214. The feature code data entry 500 may include the user identifier 402 for the user to which the feature code 214 relates. In some embodiments, the feature code data entry 500 may additionally include a name indicator 404 indicating the name of the user to which the feature code 214 relates. The feature code data entry 500 further comprises a feature code indicator 502 indicating the feature code 214. For example, the feature code indicator 502 may list the characters of the feature code 214, as shown. In some embodiments, the feature code indicator 502 may include the feature code 214. Accordingly, the feature code 214 may be included directly within the feature code data entry 500. In some embodiments, the feature code data entry 500 may include information relating to a location. For example, feature codes 214 generated based on the location hierarchy tree 300 may relate to a location entry 310 such that the location indicator 410 may be included in the feature code data entry 500.

In some embodiments, the information within the feature code data entry 500 may be added to the profile data entry 400. For example, embodiments are contemplated in which the feature code indicator 502 may be added to and stored with the profile data entry 400. As such, in some embodiments, the feature code indicator 502 is stored in a profile data table such that the separate feature code data entry 500 is not needed. Further, embodiments are contemplated in which information from the profile data entry 400 may be copied into the feature code data entry 500. For example, meta data within the profile data may be added to the feature code data entry 500.

Figure 6:
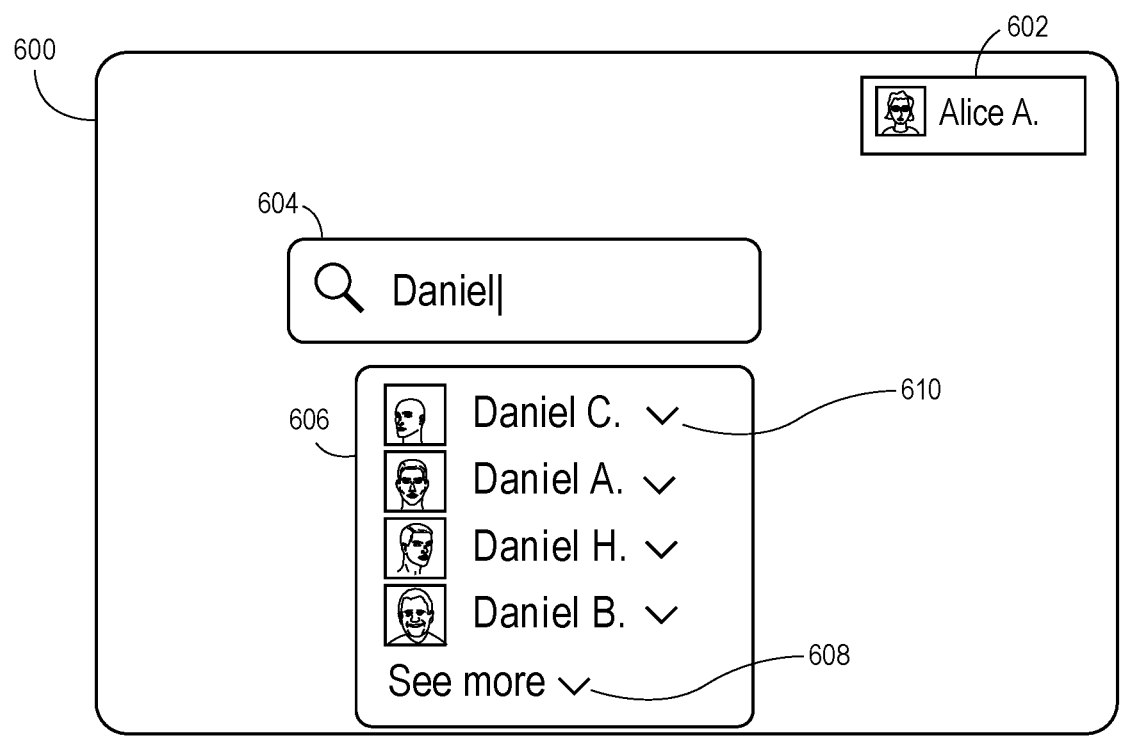
FIG. 6 depicts an exemplary search interface relating to some embodiments.

Turning now to FIG. 6, an exemplary search interface 600 is depicted relating to some embodiments. In some such embodiments, the search interface 600 may be generated for display on a graphical user interface. Here, the search interface 600 may be associated with an application or a web browser running on a user device, such as a laptop computer, desktop computer, or mobile phone. In some embodiments, the search interface 600 includes a user indicator 602. Here, the user indicator 602 may provide an indication of which user is logged-in to the application or web browser on the user device. In some embodiments, a first user may use the user device to log-in to a search system which may be generated for display on the search interface 600, as shown. Accordingly, the search interface 600 may include a search bar 604 which may be a text input field. For example, the first user may use the search bar 604 to provide search terms.

In one example, the first user may begin to type a name, as shown, to search for a specific user. Accordingly, when the first user inputs a search term in the search bar 604 the search interface 600 may provide a list of search results 606, as shown. In some embodiments, the search results 606 may be generated after the user has entered a search term. Alternatively, in some embodiments, the search results 606 may be auto-completed as the user types in the search bar 604. In some embodiments, the search results 606 may be ordered based at least in part on the feature codes 214 of each user. Here, the feature codes of each user in the list of search results 606 may be compared to the feature code of the first user. In some embodiments, an actuator 608 may be included, for example, to expand the list of search results 606.

In some embodiments, the search interface 600 further comprises an additional information actuator 610 which may be selected by a user to present additional information to the user. For example, an additional information actuator 610 may be included for each user in the list of search results 606 such that the user can view additional information respective to each user. In some embodiments, the additional information may include the user's feature code or feature code closeness score. Additionally, the additional information may include an indication of the user's job title or other user information.

In one specific example, a user, Alice A., types the name "Daniel" in the search bar 604. Accordingly, search results 606 may be generated including a plurality of users named Daniel. Here. the users in the list of search results are ordered based on their feature codes. In some embodiments, the feature code associated with the user Alice A. may be retrieved. Next, the feature codes may be retrieved for each of the users in the search results and compared to the feature code of Alice A. The users may then be ordered such that the users with feature codes closest to that of Alice A. appear first. Accordingly, the feature codes may be compared to determine a feature code difference. In some embodiments, one or more feature codes for each user may be considered. For example, embodiments are contemplated in which both a report line feature code and a location feature code are compared for each user. In some embodiments, each type of feature code may be associated with a feature code weight such that the feature codes may have varying effects on the order of the users.

Figure 7:
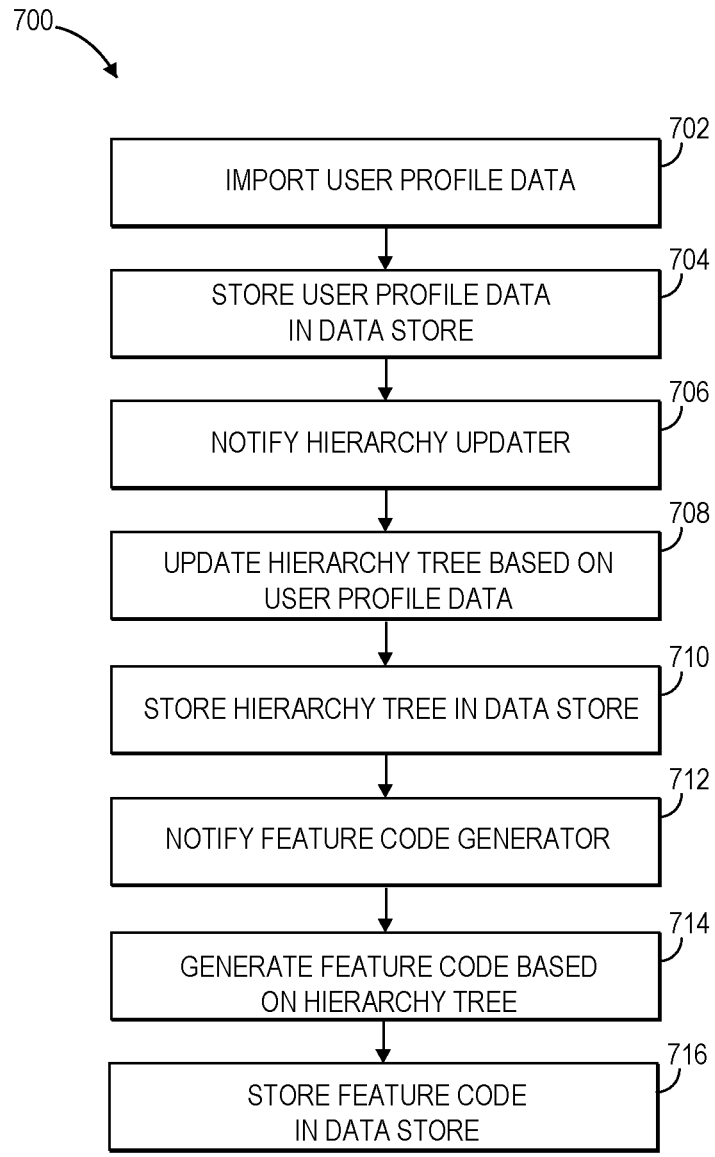
FIG. 7 depicts a method for determining a connection degree relating to some embodiments.

Turning now to FIG. 7, a method for determining a connection degree is depicted relating to some embodiments. In some embodiments, at least a portion of the steps described herein may be performed on one or more processors. For example, in some embodiments, at least a portion of the steps may be executed on the processing component 102 of the system 100, as shown in FIG. 1.

At step 702 a set of user profile data may be imported. In some embodiments, the user profile data may be a set of new user profile data or an update to existing user profile data. In some embodiments, the set of user profile data may comprise data for a single user such as a new user added to the system or updated information for an existing user. Further, in some embodiments, the set of user profile data may comprise data for a plurality of users. For example, profile data for a plurality of users from an entire company may be imported at step 702. In some embodiments, a plurality of user profiles relating to a plurality of users may be imported together, such as during initiation of a hierarchy. Further still, in some embodiments, user profile data may be removed. For example, if an employee leaves a company profile data for the user may be deleted from the user profile data store 106. At step 704 the set of user profile data is stored in a data store such as the user profile data store 106. In some embodiments, the set of user profile data may be stored within a user data table. Further still, in some embodiments, the set of user data may be received as a user profile data entry such as the profile data entry 400, as shown in FIG. 4.

At step 706 the hierarchy updater 110 is notified of the imported user profile data. In some embodiments, the hierarchy updater 110 may be notified by either of the user profile data store 106 or the employee controller 104 in response to receiving or storing the imported profile data. Further, in some embodiments, the notification may include information indicative of the imported user profile data or may even include the user profile data itself. In response to the notification, the hierarchy updater 110 updates a hierarchy tree based on the imported user profile data at step 708. In some embodiments, the hierarchy tree may be updated, for example, by adding an entry 210 or changing report line information. For example, the imported profile data may indicate a change in the report line structure such as a user getting fired or receiving a promotion. Accordingly, in some embodiments, the hierarchy tree may be updated at step 708 to change the report line connections within the hierarchy tree. In some embodiments, the hierarchy tree may be updated in response to a change in user profile data. However, embodiments are contemplated in which the hierarchy tree may be updated periodically such as once a day or once a week.

At step 710 the updated hierarchy tree is stored in a data store such as the hierarchy data store 112. In some embodiments, the updated hierarchy tree may be stored over a previous version of the hierarchy tree. Alternatively, in some embodiments, it may be desirable to store both the previous version and the updated version of the hierarchy tree for versioning purposes. For example, in some embodiments, a versioning data store may be included in the system 100 for storing previous copies of the hierarchy tree. At step 712 the feature code generator 116 is notified of the updated hierarchy tree. In some embodiments, the notification to the feature code generator 116 may be transmitted from either of the hierarchy data store 112 or the hierarchy updater 110 in response to updating the hierarchy tree.

At step 714 a feature code is generated based on the updated hierarchy tree by the feature code generator 116. In some embodiments, the feature code may be generated in response to the notification to the feature code generator 116. In some embodiments, generating the feature code at step 714 comprises recalculating one or more feature codes based on the updated hierarchy tree. For example, a feature code for a given user or object in a hierarchy tree may already be established, however, when the hierarchy tree is updated the feature code may be recalculated based on the changes to the hierarchy tree. In some embodiments, a plurality of feature codes may be recalculated. Further, in some embodiments, the system may be capable of identifying which specific feature codes are affected by a particular change in the hierarchy tree. At step 716 the feature code is stored in a data store such as the feature code data store 118. In some embodiments, for example, where a plurality of feature codes is generated, each of the plurality of feature codes are stored in said data store.

Figure 8:
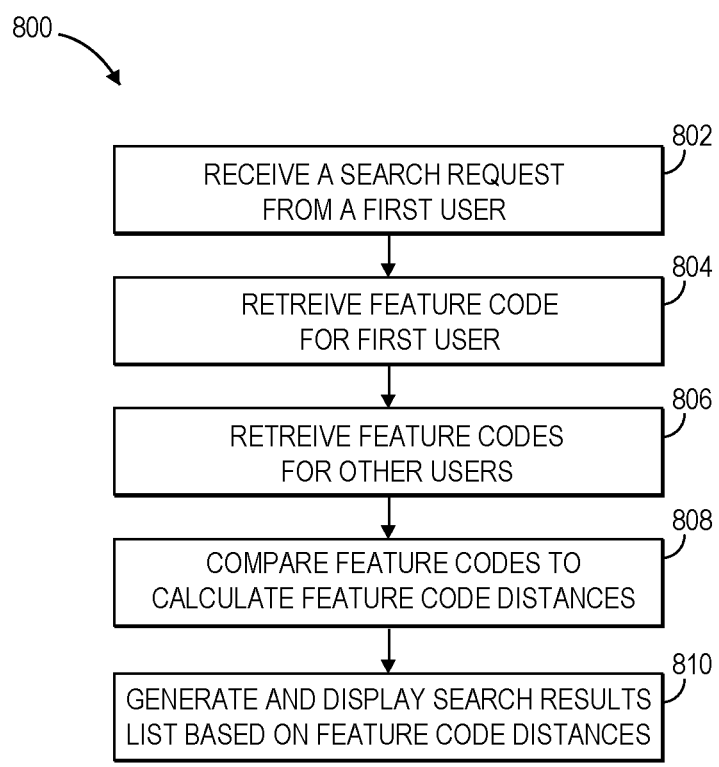
FIG. 8 depicts a method for generating search results relating to some embodiments.

Turning now to FIG. 8, an exemplary method for generating search results is depicted relating to some embodiments. In some embodiments, at least a portion of the steps described herein with respect to FIG. 8 may be carried out using the employee search controller 122. At step 802 a search request is received from a first user. In some embodiments, the search request may be received via the search interface 600, as shown in FIG. 6. For example, in some embodiments, the search request comprises one or more search terms or phrases such as a username or job description. At step 804 a feature code may be retrieved for the first user. In some embodiments, said feature code may be received from the feature code data store 118. Further, in some embodiments, a plurality of feature codes may be retrieved for the first user such as a report line feature code and a location feature code. For example, the employee search controller 122 may use a username or user identifier associated with the first user to query the feature code data store 118 to locate one or more feature codes associated with the first user.

At step 806 feature codes are retrieved for a plurality of other users. In some embodiments, the plurality of other users may be determined based at least in part on one or more search terms in the search request. For example, if the first user submits a search request comprising the search term, "John", a plurality of users named John may be identified as relevant other users for the search. Accordingly, the feature codes of said relevant users may be retrieved at step 806. In some embodiments, one or more feature codes may be retrieved for each of the plurality of other users. For example, a report line feature code and a location feature code may be retrieved for each user.

At step 808 the feature codes for the plurality of other users are compared with the feature code (or feature codes) of the first user to calculate a plurality of feature code distances. For example, in some embodiments, the report line feature codes of the plurality of other users are compared to the report line feature code of the first user and the location feature codes of the plurality of other users are compared to the location feature code of the first user. Further, in some embodiments, various other types of feature codes may be included and compared at step 808. Table 2 depicted below shows an exemplary comparison of two feature codes.

TABLE 2

| Feature Codes | Part 1: Shared | Part 2: Different | Part 3: Missing |
| --- | --- | --- | --- |
| "11111" | 111 | 1 | 1 |
| "111a" | 111 | a | NULL |

As shown above in Table 2, the comparison of two feature codes may be separated into three parts. Specifically, Table 2 shows an exemplary comparison of the feature codes "11111" and "111a" in which the results of the comparisons are shown in columns 2-4. For example, a first part may correspond to a shared portion of the feature codes. Accordingly, the first part may always correspond to a distance of zero because it includes the identical portions of the feature codes such that there is no difference. In some embodiments, the shared portion may only include the left most characters of the feature codes which are shared. For example, feature codes, "11111" and "1a1a" would only share a single character "1". A second part may correspond to the differing portions of the feature codes. Accordingly, the second part will correspond to a non-zero distance value if the feature codes are not identical. In some embodiments, the distance value may be calculated by determining the difference of the index values for each character slot within the differing portions of the feature codes. A third part may correspond to a missing portion of one of the feature codes. In some embodiments, the missing portion may be associated with a predefined constant value such that the constant value is included in the distance calculation if the number of characters differs between the two feature codes. In some embodiments, the feature code distance may be calculated, as shown below.

$$d(F_i, F_j) = d_1(F_i, F_j) + d_2(F_i, F_j) + d_3(F_i, F_j)$$

$$d_1(F_i, F_j) = 0$$

$$d_2(F_i, F_j) = \sum_{k=M, l=N-k+1}^{N} w_l(dis(C_{i,k} - C_{j,k})) = \sum_{k=M, l=N-k+1}^{N} w_l(Ind(C_{i,k}) - Ind(C_{j,k}))$$

$$d_3(F_i, F_j) = \sum_{k=N}^{L} Con * w_k$$

Here, $F_i$ and $F_j$ represent the two feature codes, and $d(F_i, F_j)$ is the distance between the two feature codes. $d_1(F_i, F_j)$, $d_2(F_i, F_j)$, and $d_3(F_i, F_j)$ are the distances of the first part, second part, and the third part respectively. $dis(C_{i,k}-C_{j,k})$ is the distance between two characters within the feature codes at a given level. In some embodiments, a distance may be determined for each level of the second part of the feature codes. The current level may be denoted as level l. In some embodiments, the distance is measured by calculating the distance between the index values of the two characters (noted by Ind(C)) in the character table, such as Table 1 shown above. Ind $(C_{i,k})$ is the index of the character $C_{i,k}$ from the character table and $C_{i,k}$ is the $k^{th}$ char in the feature code $F_i$. For example, if $F_i$ is "112a4", and k=4, then $Ind(C_{i,k})$=Ind(a)=36 according to the character table, Table 1.

$w_l$ is a weight for the distance in the level l. For example, in some embodiments, each level may be associated with a specific weight which determines the impact of the distance for a level on the overall comparison for the feature codes. In some embodiments, the maximum weight may be associated with the first level of the hierarchy tree and the minimum weight may be associated with the last level of the hierarchy tree. Accordingly, the weight may decrease as the level increases such that the impact of a difference in characters is greater for a lower hierarchy level. Here, in some embodiments, the weight for the last level may be equal to one such that a difference in characters at the last level may be calculated directly as the difference in the index values of the feature code characters. In some embodiments, Con is a constant value. For example, Con may be equal to one, such that the third part may be determined directly as the weight $w_k$. In some embodiments, weight $w_k$ may be a weight specific to the level similar to the weight $w_l$, as described above. However, embodiments are contemplated in which a variety of different calculation methods may be used to determine the feature code distance.

Referring to FIGS. 2A and 2B, a generic description of how these equations can be used to compare a closeness of two employees is as follows. When referring to Alice A, who has feature code 1111, is compared against Daniel A, who has feature code 1113, a first comparison may simply be in the number of digits in each feature code. In the example shown in FIGS. 2A and 2B, the four digits indicate both employees are in Level 4. A next step may include determining where each feature code is the same from left to right. Again, Alice A. and Daniel A. share the same first three digits of 111, but differ in the last digit of 1 for Alice A. and 3 for Daniel A. This indicates that Alice A. and Daniel A. share the same direct manager John J. who has feature code 111. Thus, Alice A. and Daniel A. have a relative closeness within the organization.

Comparing Alice A., again with feature code 1111, against Jane H., with feature code 1121, yields a different result.

Again, they share the same number of digits, in this case 4, but they share only the first 2 digits of 11 and differ in their last 2 digits; 11 for Alice A. and 21 for Jane H. This means Alice A. and Jane H. have a relative closeness in the organization based on sharing the same Level 2 manager Alice P. who has feature code 11 in addition to being in the same Level 4.

Comparing Alice A., again with feature code 1111, against Daniel B., with feature code 12, yields yet a different result. In this case, they have a different number of digits, Alice A. has 4 while Daniel B. has 2, which indicates they reside in different levels in the organization. Further, they only share the first digit, 1, associated with Daniel H. whose feature code is 1.

Using these three examples above, different weights w may be applied to various differences and shared characteristics of the feature codes to arrive at different results. As one example, Alice A. and Daniel A. may be ranked closer together than Alice A. would be to Jane H. or Daniel B. as Alice A. and Daniel A. are in the same level, Level 4, with the same direct manager John J. with feature code 111. In alternative weighing schemes, Alice A. may be determined to be closer to Jane H. than either Daniel A. or Daniel B. because Alice A. and Jane H. are in the same level, Level 4, but share a higher order manager in Alice P. with feature code 11 (Daniel A. may have other factors, perhaps location or job description, which causes the relationship between Alice A. and Daniel A. to be less than the relationship between Alice A. and Jane H). In yet another weighting scheme, the relative closeness to Alice A. may be more strongly influenced by the highest-level common manager. Using the example above, Alice A. would be closer to Daniel B. than either Jane H. or Daniel A. as the next highest common manager is Daniel H. with a feature code of 1. Other configurations of weights may also be implemented to arrive at different levels of relative closeness as contemplated by this invention.

It should also be noted that tie breaking criteria may also be used. As an example, in some circumstances, two employees will have the same closeness score as a first employee. In these circumstance other criteria, such as using an alphabetical listing to place employees with a last name beginning with the letter, "A" above a similarly ranked employee who has a last name beginning with the letter, "B." Other criteria could include years employed with the company, a commonly shared skill (e.g., expertise in a particular software language) or a common manager or location in the past (e.g., a relationship determined after a company reorganization may find it beneficial to use this criteria right after the reorganization).

At step 810 a list of search results is generated based on the feature code distances calculated at step 808 and displayed to the user. In some embodiments, the search results in the list may be ordered according to the calculated feature code distances such that the search result with the lowest feature code distance is listed first. In some embodiments, the search results may be displayed in a graphical user interface, as shown in FIG. 6 above.

Embodiments are contemplated in which multiple feature code distances are calculated for each search result and added to determine a total feature code distance. For example, in some embodiments, a report line feature code distance and a location feature code distance may be determined for each of the other users and the two feature code distances may be combined to determine a total feature code distance for a given user of the plurality of other users. Further, embodiments are contemplated in which any number of feature code distances may be determined and combined for each of the plurality of other users. In some embodiments, each type of feature code distance may be associated with a feature code weight which determines the impact of the particular type of feature code distance on the total feature code distance. Accordingly, embodiments are contemplated in which a variety of different connection types are considered to determine a connection degree between two users.

In some embodiments, the various methods described herein for determining a connection degree between users and generating search results may be applied to additional types of hierarchies. For example, in some embodiments, hierarchy trees may be provided for various additional objects besides the employees and locations, as described herein, such that feature codes relating to additional objects may be used to determine a connection degree between said objects. Further, in some embodiments, a list of search results may be generated based on comparing feature codes of said additional objects.

Figure 9:
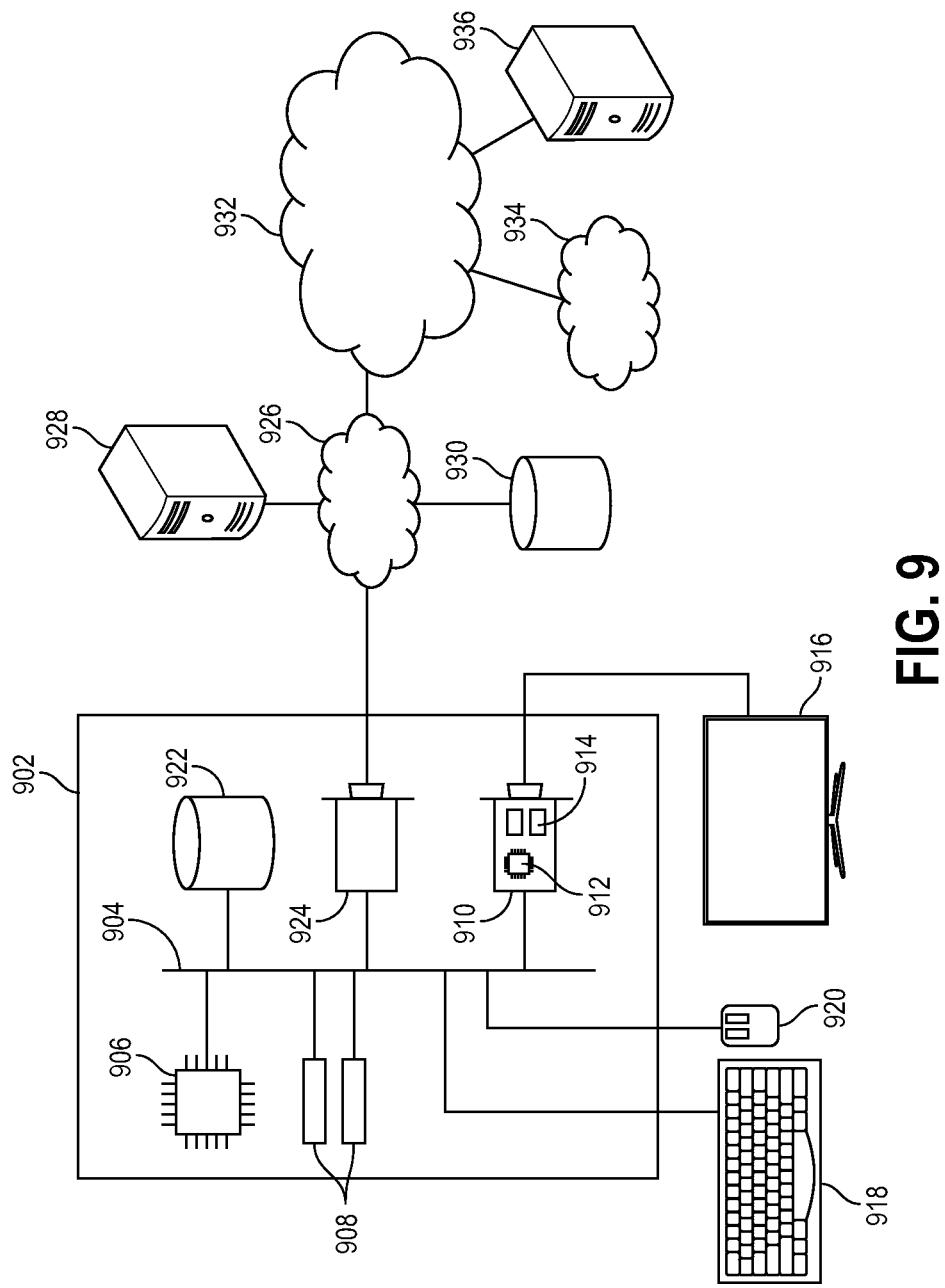
FIG. 9 an exemplary hardware platform relating to some embodiments.

Turning now to FIG. 9, an exemplary hardware platform for certain embodiments is depicted. Computer 902 can be a desktop computer, a laptop computer, a server computer, a mobile device such as a smartphone or tablet, or any other form factor of general- or special-purpose computing device. Depicted with computer 902 are several components, for illustrative purposes. In some embodiments, certain components may be arranged differently or absent. Additional components may also be present. Included in computer 902 is system bus 904, whereby other components of computer 902 can communicate with each other. In certain embodiments, there may be multiple busses or components may communicate with each other directly. Connected to system bus 904 is central processing unit (CPU) 906. Also attached to system bus 904 are one or more non-transitory, random-access memory (RAM) modules 908. Also attached to system bus 904 is graphics card 910. In some embodiments, graphics card 910 may not be a physically separate card, but rather may be integrated into the motherboard or the CPU 906. In some embodiments, graphics card 910 has a separate graphics-processing unit (GPU) 912, which can be used for graphics processing or for general purpose computing (GPGPU). Also on graphics card 910 is GPU memory 914. Connected (directly or indirectly) to graphics card 910 is display 916 for user interaction. In some embodiments no display is present, while in others it is integrated into computer 902. Similarly, peripherals such as keyboard 918 and mouse 920 are connected to system bus 904. Like display 916, these peripherals may be integrated into computer 902 or absent. Also connected to system bus 904 is local storage 922, which may be any form of computer-readable media, and may be internally installed in computer 902 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 924 is also attached to system bus 904 and allows computer 902 to communicate over a network such as network 926. NIC 924 can be any form of network interface known in the art, such as Ethernet, ATM, fiber, Bluetooth, or Wi-F, (i.e., the IEEE 802.11 family of standards). NIC 924 connects computer 902 to local network 926, which may also include one or more other computers, such as computer 928, and network storage, such as data store 930. Generally, a data store such as data store 930 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 928, accessible on a local network such as local network 926, or remotely accessible over Internet 932. Local network 926 is in turn connected to Internet 932, which connects many networks such as local network 926, remote network 934 or directly attached computers such as computer 936. In some embodiments, computer 902 can itself be directly connected to Internet 932.

Although the present teachings have been described with reference to the embodiments illustrated in the attached drawing figures, it is noted that equivalents may be employed and substitutions made herein without departing from the scope of the present teachings as recited in the claims.

Having thus described various embodiments, what is claimed as new and desired to be protected by Letters Patent includes the following:

1. One or more non-transitory computer-readable media storing computer-executable instructions that, when executed by a processor, perform a method for determining a connection degree, the method comprising:
   importing a set of user profile data;
   storing the set of user profile data in a user profile data store;
   notifying a hierarchy updater in response to importing the set of user profile data;
   reading the set of user profile data and updating a hierarchy tree based on the set of user profile data;
   storing the updated hierarchy tree in a hierarchy data store;
   notifying a feature code generator in response to storing the hierarchy tree;
   reading the updated hierarchy tree and generating a feature code based on the updated hierarchy tree, the feature code configured to determine a connection degree between a first user and a plurality of other users associated with the hierarchy tree and to generate the feature code having a first number of characters, wherein the first number of characters is correlated with the connection degree;
   storing the feature code in a feature code data store;
   generating a graphical user interface containing a search interface;
   receiving a search request via the search interface;
   obtaining a set of search results based on the search request; and
   presenting the search results, ordered based on comparison of a number of characters in a feature code for each search result.

2. The media of claim 1, wherein the hierarchy tree comprises employee report line data indicative of a plurality of report line relationships and the feature code is a report line feature code.

3. The media of claim 1, wherein the hierarchy tree comprises location data indicative of a plurality of location-based relationships and the feature code is a location feature code.

4. The media of claim 1, further comprising:
   further updating the hierarchy tree in response to a change in a set of user data; and
   updating the feature code in response to updating the hierarchy tree.

5. The media of claim 1, further comprising:
   periodically updating the hierarchy tree; and
   updating the feature code based on the hierarchy tree.

6. The media of claim 1, wherein the feature code data store comprises a feature code table including a plurality of feature codes and a corresponding plurality of user identifiers associated with the respective plurality of feature codes.

7. A method for determining a connection degree, the method comprising:
   importing a set of user profile data;
   storing the set of user profile data in a user profile data store;
   notifying a hierarchy updater in response to importing the set of user profile data;
   reading the set of user profile data and updating a hierarchy tree based on the set of user profile data;
   storing the updated hierarchy tree in a hierarchy data store;
   notifying a feature code generator in response to storing the hierarchy tree;
   reading the updated hierarchy tree and generating a feature code based on the updated hierarchy tree, the feature code configured to determine a connection degree between a first user and a plurality of other users associated with the hierarchy tree and to generate the feature code having a first number of characters, wherein the first number of characters is correlated with the connection degree;
   storing the feature code in a feature code data store;
   generating a graphical user interface containing a search interface;
   receiving a search request via the search interface;
   obtaining a set of search results based on the search request; and
   presenting the search results, ordered based on comparison of a number of characters in a feature code for each search result.

8. The method of claim 7,
   wherein the hierarchy tree comprises a plurality of hierarchy levels,
   wherein each hierarchy level of the plurality of hierarchy levels is associated with weight, and
   wherein the weight is used to calculate feature code distances and the search results, are further ordered based on the feature code distances.

9. The method of claim 8, wherein the hierarchy tree comprises both of report line data indicative of a plurality of report line relationships and location data indicative of a plurality of location-based relationships.

10. The method of claim 9, further comprising generating a report line feature code and a location feature code based on the hierarchy tree.

11. The method of claim 7, wherein the feature code is stored in an employee data table along with a set of employee data.

12. The method of claim 7, further comprising:
periodically updating the hierarchy tree; and
updating the feature code based on the hierarchy tree.

13. A system for determining a connection degree, the system comprising:
a user profile data store;
a hierarchy data store;
a feature code data store; and
a processor for executing a method of determining a connection degree, the method comprising:
importing a set of user profile data;
storing the set of user profile data in a user profile data store;
notifying a hierarchy updater in response to importing the set of user profile data;
reading the set of user profile data and updating a hierarchy tree based on the set of user profile data;
storing the updated hierarchy tree in a hierarchy data store;
notifying a feature code generator in response to storing the hierarchy tree;
reading the updated hierarchy tree and generating a feature code based on the updated hierarchy tree, the feature code configured to determine a connection degree between a first user and a plurality of other users associated with the hierarchy tree and to generate the feature code having a first number of characters, wherein the first number of characters is correlated with the connection degree;
storing the feature code in a feature code data store;
generating a graphical user interface containing a search interface;
receiving a search request via the search interface;
obtaining a set of search results based on the search request; and
presenting the search results, ordered based on comparison of a number of characters in a feature code for each search result.

14. The system of claim 13, further comprising:
defining a character table based on the hierarchy tree,
wherein the feature code is generated based at least in part on the character table.

15. The system of claim 13, wherein the hierarchy tree comprises employee report line data indicative of a plurality of report line relationships and the feature code is a report line feature code.

16. The system of claim 15, further comprising:
further updating the hierarchy tree in response to a change in a set of employee report line user data; and
updating the report line feature code in response to updating the hierarchy tree.

* * * * *